UNITED STATES PATENT OFFICE.

WILLIAM W. CHIPMAN, OF NEW YORK, N. Y., ASSIGNOR TO SPENCER D. SCHUYLER, OF SAME PLACE, AND THE GRAPHITE STEEL AND IRON COMPANY, OF NEW HAMBURG, NEW YORK.

PROCESS OF MAKING STEEL.

SPECIFICATION forming part of Letters Patent No. 265,656, dated October 10, 1882.

Application filed December 29, 1881. (No specimens.)

*To all whom it may concern:*

Be it known that I, WILLIAM W. CHIPMAN, of the city, county, and State of New York, have invented a new and useful Process for Making Steel; and I hereby declare that the following is a full, clear, and exact description and specification of the same.

My process relates to the making of steel direct from the oxide-of-iron ores or from sand and furnace-slags containing oxides of iron.

My process consists in melting said oxides of iron in a furnace or crucible composed wholly or in part of plumbago, or lined with plumbago alone or a mixture of plumbago with some refractory material, such as fire-clay or the like. The oxide of iron, when thus melted from said ores, sand, or slags, by coming in direct contact with the inner surfaces of the furnace or crucible, absorbs carbon from them in quantity in proportion to the length of time the same are in contact.

I have found in practice that an excellent quality of low steel may be obtained by allowing the melted metal to remain in the furnace or crucible about one hour, and that a superior grade of high steel may be obtained by about two hours' contact after melting. After the melted oxide of iron has been sufficiently carbonized I pour the same into molds, then remove the ingots and pass them between rolls or put them under a hammer to form them into the shapes desired.

I am aware that blister-steel and wrought-iron, with various other materials containing carbon, have been melted in plumbago crucibles to make cast-steel; but 1 am not aware that oxide-of-iron ores or that sand or slags containing oxides of iron have been converted or reduced to steel by contact with the inner surfaces of plumbago in furnaces or crucibles, as above described.

I am also aware that steel has been made from the ore direct by mixing with the same various fluxes and carbonaceous materials. I have ascertained that steel may be made without the addition of fluxes or carbonaceous matters to the oxide ores, and that the carbonaceous material of a carbon crucible may be made to deoxidize and reduce the oxide ore and carbonize the same to the desired extent. It will be therefore seen that by a single operation, and without the admixture of foreign substances, I am enabled to produce steel directly from the ore, whereas in the former methods the making of the steel has required two distinct operations—viz., the reduction of the ore into some state of iron and its reconversion into steel by the use of additional carbonaceous matter, or else has been accomplished through the addition to the raw material of various fluxes and foreign matters.

Having now fully described my process, what I claim as my invention, and desire to secure by Letters Patent, is—

The process, substantially as hereinbefore set forth, of making steel directly from the oxide-of-iron ores or from sands or furnace-slags containing oxides of iron by melting them in a furnace or crucible having its inner surfaces composed wholly or in part of plumbago, so that the oxides of iron shall be converted or reduced to steel, substantially as described.

WILLIAM WIRT CHIPMAN.

Witnesses:
    W. C. HICKS,
    J. M. HICKS.